United States Patent [19]

Burger

[11] Patent Number: 5,699,579
[45] Date of Patent: Dec. 23, 1997

[54] DEVICE FOR WASHING VEHICLES

[76] Inventor: Joerg Burger, Kirchenstrasse 5 a, D-85253 Eisenhofen, Germany

[21] Appl. No.: 659,831

[22] Filed: Jun. 7, 1996

[30] Foreign Application Priority Data

Jun. 8, 1995 [DE] Germany .................. 295 09 406 U

[51] Int. Cl.⁶ .................................................. B60S 3/06
[52] U.S. Cl. ................... 15/230.14; 15/97.3; 15/230; 15/230.16
[58] Field of Search ................ 15/97.3, 230, 230.14, 15/230.15, 230.16, 230.17, 230.18, 230.19

[56] References Cited

U.S. PATENT DOCUMENTS

| | | | |
|---|---|---|---|
| 981,841 | 1/1911 | Codman | 15/230.14 |
| 2,188,375 | 1/1940 | Sayers | 15/230.14 |
| 2,508,065 | 5/1950 | Hendrickson | 15/230.14 |
| 2,803,096 | 8/1957 | Mockiewicz | 15/230.14 |
| 2,867,062 | 1/1959 | Hendrickson | 15/230.14 |
| 2,983,940 | 5/1961 | Beyer-Olsen | 15/230 |
| 3,296,646 | 1/1967 | Bizovi | 15/230.16 |
| 3,857,135 | 12/1974 | Takeuchi | 15/97.3 |
| 4,603,447 | 8/1986 | Beer | 15/97.3 |
| 4,653,135 | 3/1987 | Clark | 15/97.3 |
| 4,930,179 | 6/1990 | Wright | 15/230.16 |
| 4,967,440 | 11/1990 | Belanger | 15/97.3 |
| 5,410,770 | 5/1995 | Nittoli | 15/97.3 |
| 5,461,745 | 10/1995 | Nittoli | 15/97.3 |

*Primary Examiner*—David Scherbel
*Assistant Examiner*—Randall Chin
*Attorney, Agent, or Firm*—Antonelli, Terry, Stout & Kraus, LLP.

[57] ABSTRACT

A device for washing vehicles, in which several supporting disks are arranged adjacent to one another on a rotating shaft, radially protruding flat strips made of a textile material being attached to the supporting disks, the strips being folded in their longitudinal direction in a region of attachment to the disks and the folded portions of the strips being connected to their supporting disks so as to be flat.

17 Claims, 4 Drawing Sheets

DEVICE FOR WASHING VEHICLES

FIELD OF THE INVENTION

The invention relates to a device for washing vehicles.

BACKGROUND TO THE INVENTION

Devices for washing vehicles are known in which several supporting disks are arranged adjacent to one another on a rotating shaft. Radially protruding flat strips made of a textile material are attached, connected to each supporting disk, whereby the strips are fastened to the supporting disk so as to be flat and thus extend essentially in the plane of the supporting disk when the shaft rotates. When the strips come into contact with the surface of a vehicle, the outer surfaces of the strips touch the vehicle surface. They are more or less partially diverted from their plane corresponding to the contour of the vehicle. Thus, the contact surface of the strips with the vehicle is relatively slight, but on the other hand, the surface pressure which the strips exert on the vehicle surface is relatively great. The result is an unsatisfactory cleaning effect, and the danger of damage to the painted surface of the vehicle.

SUMMARY OF THE INVENTION

An object of the present invention is to provide a cleaning device such that the strips are flat when they come into contact with the vehicle surface.

In accordance with an embodiment of the invention, in a device for washing vehicles in which several supporting disks are arranged adjacent to one another on a rotating shaft, radially protruding flat strips made of a textile material are attached to each supporting disk, the strips being folded in their longitudinal direction in a region of attachment to the disk and the folded portions of the strips being connected to the supporting disk so as to be flat.

BRIEF INTRODUCTION TO THE DRAWINGS

Embodiments of the invention are described in greater detail below, with reference of the invention to the drawings, in which.

DETAILED DESCRIPTION OF PREFERRED EMBODIMENT

Figure 1:
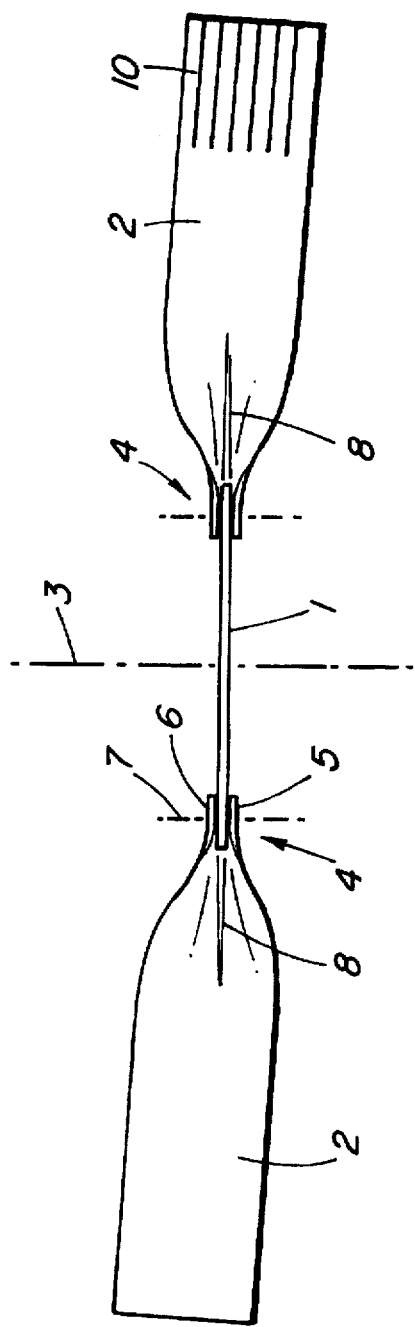
FIG. 1 is a side view of a supporting disk with two strips attached thereto in accordance with a first embodiment.
Figure 4:
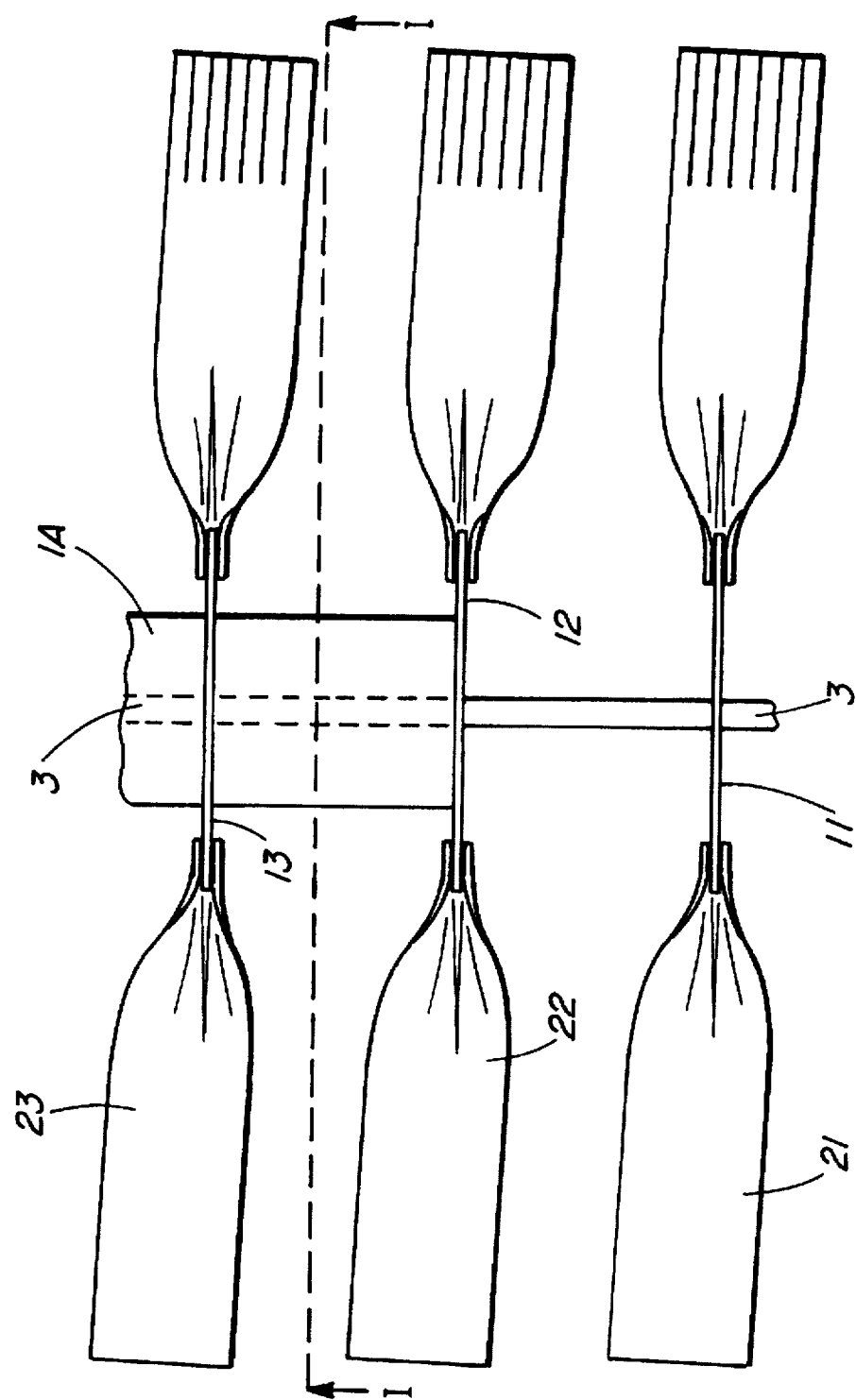
FIG. 4 is a side view of several disks separated by a spacer.
Figure 5:
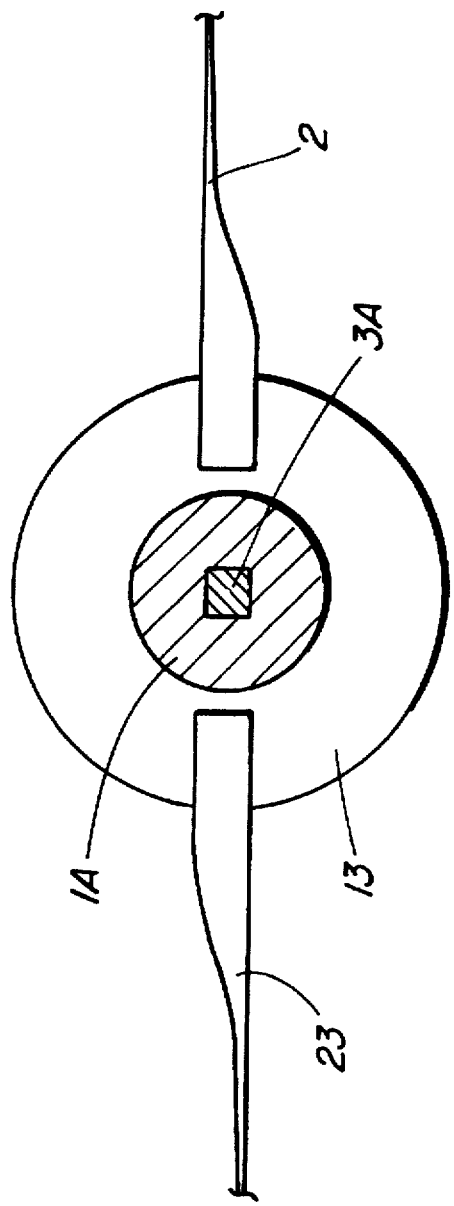
FIG. 5 is a sectional view on the line II in FIG. 4.

FIG. 1 shows a supporting disk 1 having two strips 2 of a textile material attached thereto. In practice, a total of 16 strips 2 can be, for example, attached to a supporting disk 50 cm in diameter. As shown in FIG. 4a number of these supporting disks as at 11, 12, and 13 carrying strips 21, 22 and 23, are arranged on a shaft rotatable about the axis 3. Spacers 1A which have a smaller diameter than the supporting disk 1 can be provided between adjacent supporting disks 1. Preferably, as shown in FIG. 5, the shaft rotating about the axis 3 has a square cross-section 3A and the supporting disks 1 are provided with a square opening at the centre via which the supporting disks 1 can be placed onto the shaft. The supporting disks 1, the strips 2 and also the spacers preferably are comprised of a porous synthetic material which has open pores.

In the embodiment of FIG. 1, the strips 2 have a cut in the region of the attachment 4, as a result of which two strip parts 5, 6, separated by the cut, are formed. These two strip parts are placed on both sides of the supporting disk 1 and are sewn together with it, which is indicated by the dash-dotted line 7. A fold 8, which expands outward, is this formed in longitudinal direction of the strips, so that the end areas of the strips 2 are arranged in a plane extending through the axis 3, i.e. the areas of the strips 2 adjacent to the fold 8 extend in a plane at right angles to the plane of the supporting disk 1. These outer areas of the strips 2 come into flat contact with the vehicle surface, by means of which a good cleaning effect is attained with a simultaneously low surface pressure.

Figure 2:
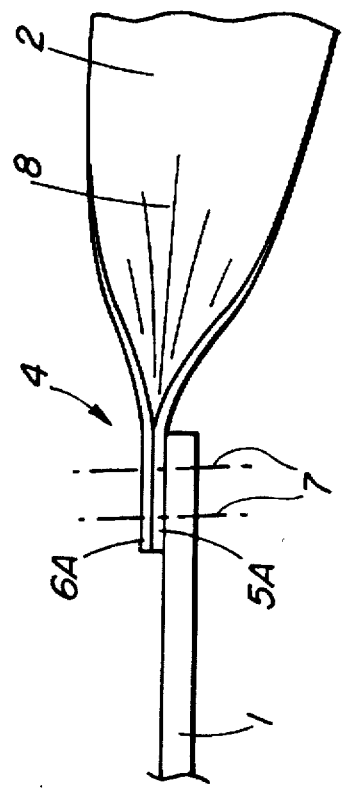
FIG. 2 is a side view of a part of a supporting disk and a part of a strip attached thereto in accordance with a second embodiment.

According to the embodiment of FIG. 2, the strip 2 is folded in the area of attachment 4 and the strip parts folded toward one another are sewn together with the upper side of the supporting disk 1. The fold 8 expands toward the outer area of the strips 2, so that the strips 2 assume a shape as shown in FIG. 1 when the supporting disk 1 rotates.

Figure 3:
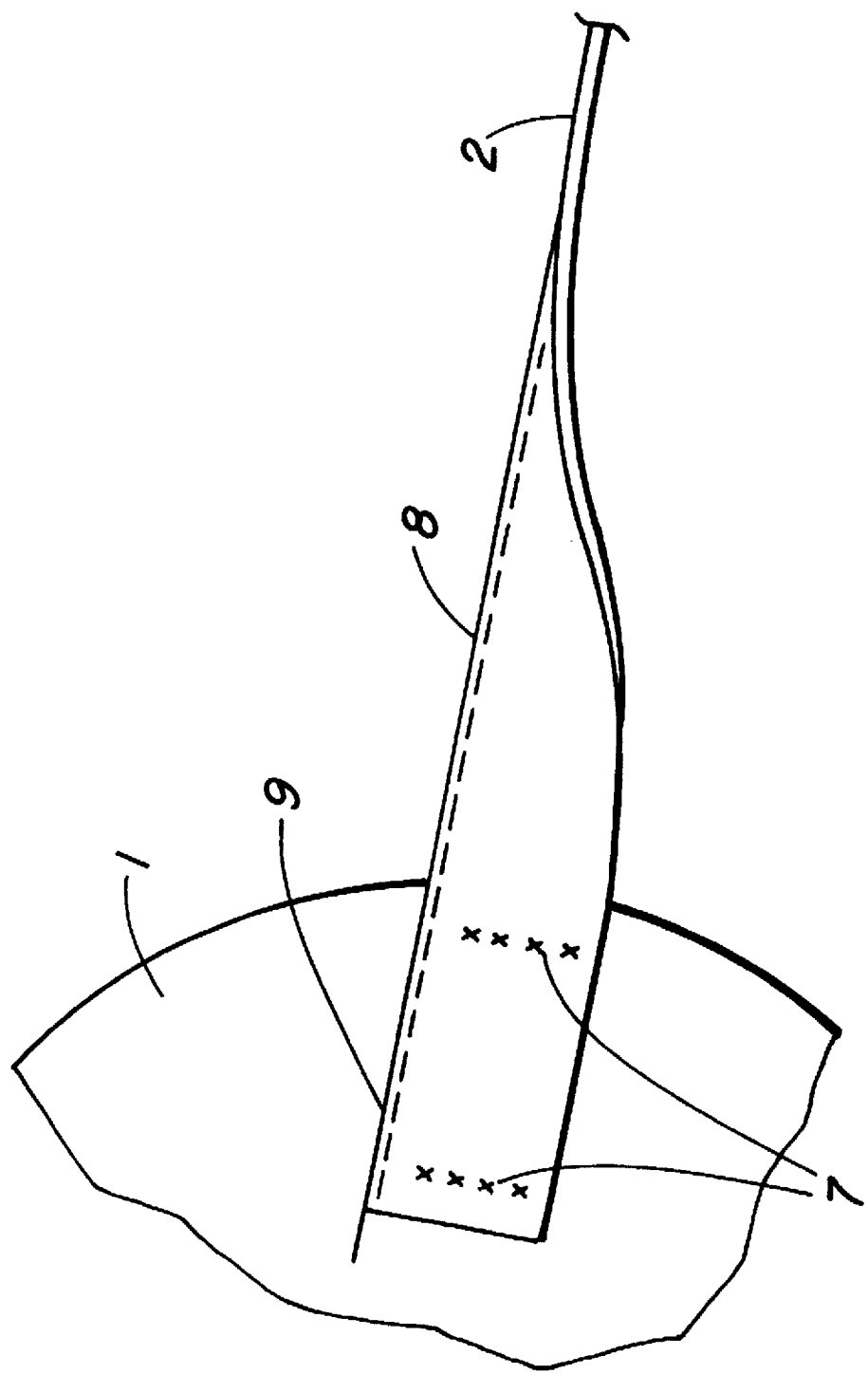
FIG. 3 is a top view of a part of a supporting disk and a part of a strip attached thereto in accordance with a third embodiment.

In the embodiment of FIG. 3, the supporting disk 1 is provided with radial cuts 9 on its periphery. Strips folded in longitudinal direction are inserted into these cuts 9 and are sewn together with the supporting disk 1. In this case also, the fold 8 expands outwardly, so that the strips 2 assume a shape as in FIG. 1.

Figure 6:
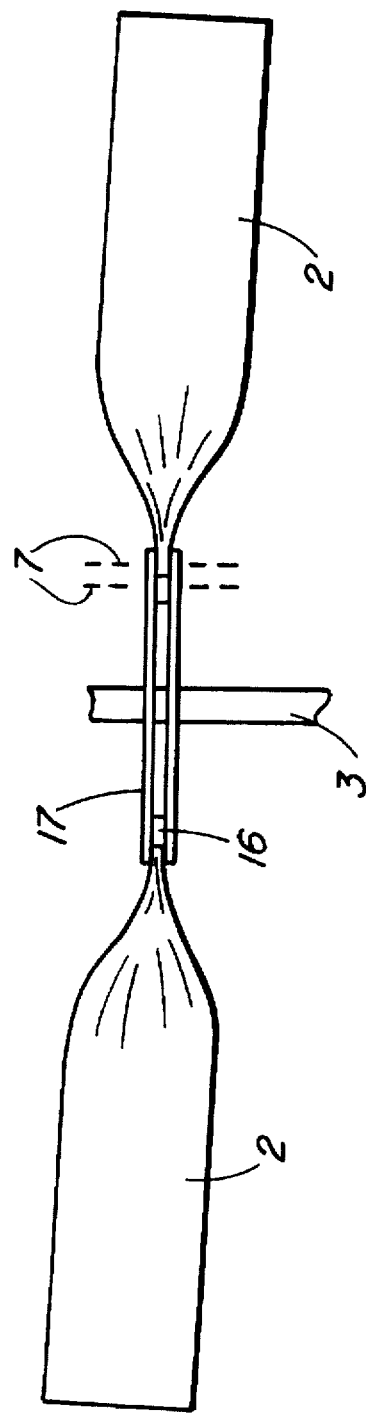
FIG. 6 is an alternative arrangement to FIG. 1.

As shown in FIG. 6, it is also possible to hold the strips, folded in the area of attachment, between two supporting disks 16 and 17 when the latter are made of an appropriately rigid material.

The free ends of the strips can be provided with cuts 10 extending in longitudinal direction of the strips.

We claim:

1. A device for washing vehicles comprising in combination:

a rotatable shaft;

a plurality of supporting disks arranged adjacent to but separated from one another on the rotatable shaft;

a plurality of radially protruding flat textile material strips;

wherein:

each of the flat strips has an inwardly folded portion forming two flat strip parts and a fold in the longitudinal direction of the strip, and the flat strip parts are each attached to the supporting disks, so that the folds expand outwardly to form outer areas of the strip which extend at right angles to the plane of the supporting disks.

2. A device as claimed in claim 1 wherein each of the strips include a cut in the folded portion separating the flat strip parts, and the parts separated by the cut are attached to opposite sides of the disk.

3. A device as defined in claim 1 wherein the folded strips are held between two supporting disks.

4. A device as defined in claim 1 wherein the supporting disks are comprised of an open porous material.

5. A device as defined in claim 4 wherein the supporting disks are comprised of an open porous material which has a greater rigidity than the rigidity of the strips.

6. A device as defined in claim 1 wherein the supporting disks are comprised of an open porous material which has a greater rigidity than the rigidity of the strips.

7. A device as defined in claim 1 wherein the strips are sewn onto the supporting disks.

8. A device as claimed in claim 7 wherein the outer areas of the strips have cuts extending in the longitudinal direction of the strips.

9. A device as defined in claim 7 further including spacers on the rotatable shaft between the supporting disks, wherein the spacers have a smaller diameter than the supporting disks.

10. A device as defined in claim 1 wherein the outer areas of the strips have cuts extending in the longitudinal direction of the strips.

11. A device as defined in claim 1 wherein the rotatable shaft has a square cross-section, and each of the disks has a central square cut out engaging the shaft.

12. A device as defined in claim 11 further including spacers on the rotatable shaft between the supporting disks, wherein the spacers have a smaller diameter than the supporting disks.

13. A device as defined in claim 1 further including spacers on the rotatable shaft between the supporting disks, wherein the spacers have a smaller diameter than the supporting disks.

14. A device as defined in claim 1, the folded portions of the strips being folded on op of one another and being attached to the supporting disk.

15. A device as defined in claim 1, in which said supporting disk contains cuts on its periphery, the folded portions of the strips extending in the region of attachment to the disk.

16. A device as defined in claim 15, the free ends of the strips having cuts extending in longitudinal direction of the strips.

17. A device as defined in claim 15, spacers being arranged between a plurality of supporting disks, said spacers having a smaller diameter than the supporting disks.

* * * * *